ID_PATENT = 2,900,142
Patented Aug. 18, 1959

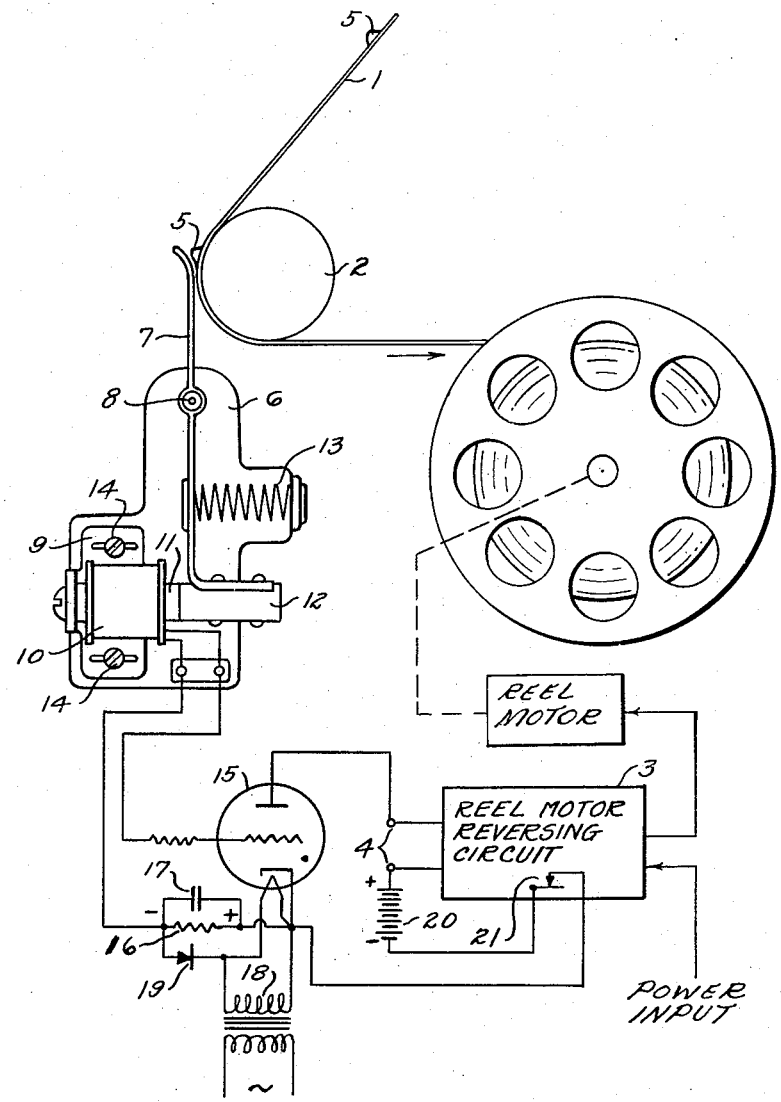
INVENTOR.
LELAND W. SPRINKLE

2,900,142

TAPE REEL DRIVE REVERSING SWITCH

Leland W. Sprinkle, Broadview, Mont.

Application January 14, 1957, Serial No. 634,131

2 Claims. (Cl. 242—55.12)

(Granted under Title 35, U.S. Code (1952), sec. 266)

The invention described herein may be manufactured and used by or for the United States Government for governmental purposes without payment to me of any royalty thereon.

This invention relates to electrical switches and has as its object the provision of a mechanically operated switch for closing an electrical circuit without the use of metallic contacts.

Briefly, the switch comprises a coil having a core of magnetic material and connected in series between the grid and cathode of a thyratron. The thyratron has a positive potential on its anode and its grid is biased sufficiently negative to prevent conduction. A permanent magnet is normally positioned adjacent to the core of the coil causing a magnetic flux to flow in the core. Mechanical switch actuating means are provided for momentarily separating the magnet from the core. Actuation of the switch therefore causes the flux in the core to be rapidly reduced and the resulting voltage induced in the coil is applied to the thyratron grid. The permanent magnet and coil are so poled that this voltage pulse drives the grid in a positive direction relative to the cathode, and the strength of the permanent magnet and the number of turns in the coil are such as to give sufficient pulse amplitude to initiate conduction in the thyratron. The thyratron is included as a series element in the circuit to be closed.

A further object of the invention, and a specific application of the switch, is to provide a reliable and fast acting means for energizing the reel motor reversing circuit of a magnetic tape rewinding mechanism. This application is shown in the drawing, with reference to which the invention will be more fully explained.

The figure is a diagrammatic view of the invention.

In the drawing, 1 represents a magnetic tape passing over idler 2 and being rewound on a reel driven by a reel motor. Such rewinding takes place at high speed and it has been found expedient to stop the tape at the end of the rewind by reversing the reel motor long enough for the opposing torque to bring the reel motor and reel to a halt. Block 3 represents the reel motor reversing circuit. Application of a voltage to terminals 4 of circuit 3 causes the torque on the armature to be reversed. Circuit 3 may be of any design suitable to the type reel motor used.

For the purpose of indicating the end of the tape during the rewinding process it is customary to attach a series of rubber bumps 5 to the tape near the end, two of which are shown in the drawing. These bumps are used to actuate a switch for energizing the reel motor reversing circuit. The switch described herein is well suited for this purpose.

The switch comprises a base plate 6 having mounted thereon an arm 7 pivoted at point 8. The base plate also has attached to it, by means of bracket 9, a coil 10 having a core 11 of high magnetic permeability. The lower end of arm 7 has a permanent magnet 12 attached. The permanent magnet is normally held against the end of core 11 under the influence of spring 13 and the magnetic attraction between magnet and core. All parts of the switch with the exception of core 11, magnet 12 and possibly spring 13 are preferably made of a nonmagnetic material such as brass or aluminum.

The position of bracket 9, and therefore core 11, may be adjusted by loosening screws 14, for the purpose of adjusting the clearance between the upper end of arm 7 and the tape.

The coil 10 is connected between the grid and cathode of thyratron 15. The grid of this tube is biased negatively with respect to the cathode by means of the direct voltage developed across resistor 16 and condenser 17 through the rectification of the secondary voltage of filament transformer 18 by rectifier 19. Terminals 4 of reversing circuit 3, a direct current source 20 and contacts 21, to be explained later, are connected in series between the anode and cathode of the thyratron.

The operation of the switch is as follows: With magnet 12 resting against the end of core 11 as shown in the drawing, the flux in core 11 and linking coil 10 has its maximum value. With the tape running at high speed the passage of a bump 5 beneath arm 7 causes magnet 12 to be rapidly moved away from the core thus increasing the gap between magnet and core and rapidly reducing the flux linking coil 10. The resulting voltage pulse induced in the coil is applied to the grid of thyratron 15. The polarity of coil 10 and magnet 12 are made such that the pulse drives the grid in a positive direction, and the strength of the magnet and number of turns of the coil are made such that the amplitude of the pulse is sufficient to overcome the negative bias on the grid and fire the tube.

Tube 15 therefore acts as a switch to apply voltage from source 20 across terminals 4 of reel motor reversing circuit 3 thus energizing the motor for reverse torque. Any suitable means for extinguishing the thyratron by momentarily breaking its anode circuit may be employed. For example, the motor reversing circuit may contain a pair of contacts 21 connected in series with the anode and arranged to momentarily open automatically after the thyratron has served its purpose.

A feature of the switch is its selectivity as to operating speed. With all other conditions constant, the voltage induced in coil 10 depends upon the rate of separation of magnet 12 from core 11. There is a certain rate of separation below which the induced voltage is insufficient to fire the magnetron. Therefore the switch will be insensitive to operations below this speed. This property may be useful in certain applications. For example, in the application shown in the drawing, the minimum operation speed may be set so that the switch is insensitive until speeds near the rewind speed of the tape are reached. Parameters determining the minimum operating speed are the number of turns in coil 10, the strength of magnet 12, the initial air-gap between magnet 12 and core 11 and the grid bias of the thyratron.

I claim:

1. In a tape rewinding mechanism in which the tape is rewound on a reel driven by a reel motor, in which motor reversing means are provided for applying a reverse torque to said motor for braking purposes, and in which said tape is provided with a series of bumps thereon for signalling the end of the tape, a switch actuated by said bumps for energizing said motor reversing means, said switch comprising a thyratron having an anode, a cathode and a grid, means for connecting the anode and cathode of said thyratron to said motor reversing circuit for energizing said circuit in the conductive condition of said thyratron, a coil having a core of high magnetic permeability and a source of negative bias connected in series between said grid and cathode, said negative bias being sufficient to prevent conductivity in said thyratron, a magnet normally positioned adjacent to said core so that its flux passes through said core and links said coil, and a mechanical actuator for said switch attached to said magnet and operated by said bumps to displace said magnet relative to said core so as to change the flux in said core and induce a voltage in said coil, the polarity of said coil and said magnet being such that said voltage drives said grid in a positive direction relative to said cathode for firing said thyratron.

2. In a tape rewinding mechanism in which the tape is rewound on a reel driven by a reel motor, in which motor reversing means are provided for applying a reverse torque to said motor for braking purposes, and in which said tape is provided with a series of bumps thereon for signalling the end of the tape, a switch actuated by said bumps for energizing said motor reversing means, said switch comprising a thyratron having an anode, a cathode and a grid, means for connecting the anode and cathode of said thyratron to said motor reversing circuit for energizing said circuit in the conductive condition of said thyratron, a coil and a source of negative bias connected in series between said grid and cathode, said negative bias being sufficient to prevent conduction in said thyratron, a magnet normally positioned adjacent to said coil so that its flux links said coil, and a mechanical actuator for said switch operated by said bumps and acting to relatively displace said magnet and coil so as to change the amount of flux linking said coil and so induce a voltage therein, the polarity of said coil and said magnet being such that said voltage drives said grid in a positive direction relative to said cathode for firing said thyratron.

References Cited in the file of this patent

UNITED STATES PATENTS

| | | |
|---|---|---|
| 1,994,624 | Sultzer et al. | Mar. 19, 1935 |
| 2,300,755 | Williams | Nov. 3, 1942 |
| 2,353,527 | Touceda et al. | July 11, 1944 |
| 2,364,556 | Somers | Dec. 5, 1944 |
| 2,490,960 | Hanchett | Dec. 13, 1949 |
| 2,538,577 | McCarty | Jan. 16, 1951 |